United States Patent
Quinet et al.

(10) Patent No.: US 10,628,193 B2
(45) Date of Patent: Apr. 21, 2020

(54) TECHNIQUE FOR OPERATING A SYSTEM CONTROLLER OF A VIRTUALIZED APPLICATION CLUSTER

(71) Applicant: Telefonaktiebolaget LM Ericsson (publ), Stockholm (SE)

(72) Inventors: Raphael Quinet, Liège (BE); Rosa María Martinez Perallón, Aachen (DE); Peter Woerndle, Wangen im Allgäu (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 127 days.

(21) Appl. No.: 15/114,481

(22) PCT Filed: Feb. 7, 2014

(86) PCT No.: PCT/EP2014/052466
§ 371 (c)(1),
(2) Date: Jul. 27, 2016

(87) PCT Pub. No.: WO2015/117669
PCT Pub. Date: Aug. 13, 2015

(65) Prior Publication Data
US 2016/0350149 A1    Dec. 1, 2016

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4416* (2013.01); *H04L 67/02* (2013.01);
(Continued)

(58) Field of Classification Search
CPC combination set(s) only.
See application file for complete search history.

(56) References Cited

U.S. PATENT DOCUMENTS

| 7,478,173 B1 * | 1/2009 | Delco | ................ H04L 12/2865 |
| | | | 709/250 |
| 9,258,266 B2 | 2/2016 | Nataraja et al. | |

(Continued)

FOREIGN PATENT DOCUMENTS

| GB | 2497196 A | 6/2013 |
| WO | 2012069064 A1 | 5/2012 |
| WO | 2015117676 A1 | 8/2015 |

*Primary Examiner* — Tuan C Dao
(74) *Attorney, Agent, or Firm* — Patent Portfolio Builders, PLLC

(57) ABSTRACT

A technique for operating a system controller of a virtualized application cluster is presented. The cluster comprises one or multiple virtual machines. In a method embodiment the system controller receives, from outside the cluster, control information defining a function associated with a virtual machine. It further receives, from the virtual machine, a request message including an identifier of the virtual machine. The method also comprises determining, based on the identifier included in the request message, the function associated with the virtual machine and booting information associated with the function. The booting information is then sent in a response message to the virtual machine.

11 Claims, 7 Drawing Sheets

(51) Int. Cl.
*H04L 29/08* (2006.01)
*G06F 9/50* (2006.01)

(52) U.S. Cl.
CPC .... *G06F 9/5072* (2013.01); *G06F 2009/4557* (2013.01); *G06F 2009/45575* (2013.01); *G06F 2009/45595* (2013.01)

(56) References Cited

U.S. PATENT DOCUMENTS

| | | | |
|---|---|---|---|
| 9,286,098 B1 | 3/2016 | Baimetov et al. | |
| 2007/0073882 A1* | 3/2007 | Brown | H04L 29/1232 709/226 |
| 2008/0089338 A1* | 4/2008 | Campbell | H04L 41/00 370/392 |
| 2009/0049295 A1* | 2/2009 | Erickson | G06F 9/4416 713/2 |
| 2010/0082799 A1* | 4/2010 | DeHaan | H04L 41/0806 709/224 |
| 2010/0153945 A1* | 6/2010 | Bansal | G06F 9/4881 718/1 |
| 2011/0126110 A1* | 5/2011 | Vilke | G06F 9/54 715/736 |
| 2012/0191884 A1 | 7/2012 | Brownlow et al. | |
| 2012/0204224 A1* | 8/2012 | Wang | H04L 67/2819 726/3 |
| 2012/0266252 A1* | 10/2012 | Spiers | H04L 63/0218 726/26 |
| 2012/0284712 A1 | 11/2012 | Nimmagadda et al. | |
| 2013/0151835 A1 | 6/2013 | Fontignie et al. | |
| 2013/0232492 A1 | 9/2013 | Wang | |
| 2013/0332982 A1* | 12/2013 | Rao | H04L 63/08 426/1 |
| 2013/0346576 A1 | 12/2013 | Huang et al. | |
| 2014/0229769 A1 | 8/2014 | Abraham et al. | |
| 2014/0233568 A1 | 8/2014 | Dong | |
| 2014/0282889 A1* | 9/2014 | Ishaya | H04L 63/08 726/4 |
| 2015/0095788 A1* | 4/2015 | Thiele | G06F 3/04817 715/735 |
| 2015/0109923 A1* | 4/2015 | Hwang | H04L 47/12 370/235 |
| 2015/0128245 A1 | 5/2015 | Brown et al. | |
| 2015/0222480 A1* | 8/2015 | Gan | H04L 61/103 709/222 |
| 2016/0077935 A1* | 3/2016 | Zheng | G06F 11/2028 714/4.12 |
| 2016/0342439 A1 | 11/2016 | Woerndle et al. | |

\* cited by examiner

TECHNIQUE FOR OPERATING A SYSTEM CONTROLLER OF A VIRTUALIZED APPLICATION CLUSTER

TECHNICAL FIELD

The present disclosure generally relates to virtualized application clusters. In particular, a technique for managing deployment of a virtualized application cluster is described. The technique can be implemented as a method, a software solution, a hardware solution, or a combination thereof.

BACKGROUND

In computing, booting is the initial set of operations a computer system performs after its start. When a computer system boots via a network connection, the Dynamic Host Configuration Protocol (DHCP) is often used to gather an Internet Protocol (IP) address by the booting computer system. To this end, the computer system sends an initial DHCP request and queries another computer system, the DHCP server, for an IP address. When the DHCP server has a valid entry for the requesting computer system in its configuration database, it will send out a DHCP response with the IP address assigned to the requesting computer system.

The IP address provided by the DHCP server can be assigned randomly or based on a system identifier contained in the DHCP request. Often, a Media Access Control (MAC) address of the requesting computer system is used by the DHCP server to assign a specific IP address to it. To this end, a mapping between MAC addresses and IP addresses can be configured by an operator after the installation of the computer systems. The mapping can also be performed automatically. When, for example, the computer systems are part of a physical blade system with multiple blade servers, the MAC addresses of the blade servers can automatically be discovered or assigned according to their physical positions in a chassis or shelf.

In a virtualized environment, such as a virtualized application cluster with multiple virtual machines, the virtual "hardware" of the virtual machines cannot be based on physical parameters identifying the physical hardware (such as a position in a chassis). However, identifying parameters can be generated automatically at deployment time of the virtual machines. Each new virtual machine can be assigned a random MAC address when it is created. This also means that the MAC address cannot be entered in a configuration database of the DHCP server before the actual deployment of the virtual machine takes place.

In a virtualized environment, a DHCP server can therefore not easily recognize the MAC address or other DHCP options of its clients (i.e., the virtual machines). This fact makes it difficult to automate the deployment of new virtual machines in a virtual environment, even though virtual environments are suitable and actually intended to exploit automated procedures. This problem applies to both legacy application clusters that are ported to a cloud or virtualized environment, and to new application clusters that are designed to work in both virtualized and physical deployments.

A possible workaround for the initial deployment of a virtualized application cluster requires human intervention. After all virtual machines have been created, an administrator may edit the configuration database of a virtual DHCP server within the cluster and give it a list of MAC addresses that have been assigned to the virtual machines. However, this solution is not suitable for fully automated deployments. Also, it requires all virtual machines to be persistent, and it makes it difficult to increase the capacity of the cluster at a later point in time by adding new virtual machines to it because the required human intervention limits the opportunities for automatic scaling.

SUMMARY

There is a need for a technique that permits an efficient deployment of virtual machines within a virtualized application cluster.

According to a first aspect, a method of operating a system controller of a virtualized application cluster which comprises at least one virtual machine is provided. The method comprises receiving, from outside the cluster, control information defining a function associated with a virtual machine and receiving, from the virtual machine, a request message including an identifier of the virtual machine. These two receiving steps can be performed in any order. The method further comprises determining, based on the identifier included in the request message, the function associated with the virtual machine and determining booting information associated with the function. Further, the method comprises sending a response message comprising the booting information to the virtual machine.

The control information may be received from any software or hardware entity outside the virtualized application cluster. The entity outside the cluster may be the entity in charge of deploying the system controller and the at least one virtual machine, or may be co-located with the deploying entity.

The control information may define a mapping between the identifier of the virtual machine and the function associated with the virtual machine. As will be appreciated, the control information may comprise a single mapping for an individual virtual machine or a plurality of such mappings for a plurality of virtual machines The control information may be received prior to the request message, after the request massage or substantially simultaneously therewith. In one variant, the control information is received prior to the request message. In another variant, the control information may be received responsive to sending the identifier included in the request message towards outside the cluster. Specifically, the identifier may be sent in response to determining that the identifier is unknown or that no function can be determined for the identifier. In the latter variant, a mapping between the identifier of the virtual machine and the function associated with the virtual machine may be established, or generated, by the system controller based on the input from outside the cluster on the one hand and from the virtual machine on the other hand.

The system controller may generally maintain (e.g., generate, update, etc.) a mapping between one or more identifiers and one or more functions. Furthermore, the system controller may maintain (e.g., generate, update, etc.) a mapping between different functions associated with virtual machines and different items of booting information. The mapping(s) may be maintained using a data structure such as a table.

It will be appreciated that the virtual machines within the cluster may have two or more different functions, and that two or more virtual machines within the cluster may have the same function. Therefore, multiple different identifiers could be mapped to the same function. A function may generally refer to a role of a virtual machine within the cluster.

The booting information may define various items of information required by the virtual machine for performing one or more operations after its initial deployment. The booting information may, for example enable the virtual machine to obtain the required software to assume its dedicated function within the cluster.

As an example, the booting information may define an address of a boot server configured to provide one or more boot files to the virtual machine. Additionally, or as an alternative, the booting information may comprise a file path to the one or more boot files (e.g., on the boot server). In one realization, the system controller may also assume the role of the boot server. The boot server may generally be configured to provide the one or more boot files via one or more Trivial File Transfer Protocol (TFTP) messages.

In certain realizations, the one or more boot files may define a configuration of the virtual machine. Such a configuration may be defined in terms of at least one of memory resources and processing resources allocated to the virtual machine.

As stated above, the control information may be received from an entity outside the cluster. In a first example, the control information is received from a cluster manager in charge of deploying the system controller and the at least one virtual machine. In another realization, the control information is received from a managing entity functionally located between the system controller and the cluster manager. The managing entity may be configured to generate the control information based on an observation of the cluster manager. In the latter realization, the managing entity may be co-located with the cluster manager.

The system controller may itself be a component of the virtualized application cluster. As such, the system controller may be a virtual machine within the cluster that takes over central tasks for one or more other virtual machines within the cluster. These tasks may comprise one or more of DHCP services, boot services and TFTP services.

The identifier of the virtual machine may have any format. As an example, the identifier may take the form of a Layer 2 address of the virtual machine. The Layer 2 address may, for example, be the MAC address of the virtual machine. In another variant, the identifier may be different from the Layer 2 address of the virtual machine. In such a case, the request message received from the virtual machine may comprise the identifier of the virtual machine in addition to its Layer 2 address. Generally, the identifier of the virtual machine may at least locally be unique (e.g., within the virtualized application cluster of the virtual machine or within multiple virtualized application clusters deployed by the same entity).

At least one of the request message received by the system controller and the response message sent by the system controller may be compliant with DHCP. As such, the system controller may provide DHCP services.

According to a further aspect a method of operating a managing component of a virtualized application cluster comprising a system controller and at least one virtual machine is provided. The method comprises sending control information to the system controller. The control information defines a function associated with the virtual machine.

The method may be performed by a cluster manager in charge of deploying the system controller and the at least one virtual machine. In such a case, the method may further comprise deploying the at least one virtual machine by the cluster manager and programming, at deployment time, the at least one virtual machine to comprise the identifier assigned thereto. The programming may be performed prior to the virtual machine sending the request message to the system controller. As an example, the cluster manager may program firmware of a (virtual) network card of the at least virtual machine to include the identifier assigned thereto.

In a further variant, the method is performed by a managing entity functionally located between the system controller and the cluster manager. In such a case the managing entity may be configured to observe the cluster manager and to generate the control information based on its observation. The cluster manager may be observed to acquire virtual machine identifiers of virtual machines managed by the cluster manager.

In one realization, the method further comprises reading by the managing component a descriptor of the virtualized application cluster. The cluster manager may have access to the descriptor via a file containing the descriptor or via suitable operator settings. The method may also comprise deploying the at least one virtual machine and, optionally, the system controller in accordance with information comprised in the descriptor.

In one example, the descriptor defines the function associated with the virtual machine. In such a case the managing component may read the function from the descriptor. The function may define booting information associated with the virtual machine.

The managing component may inform the system controller of a mapping between an identifier of the virtual machine and the function associated with the virtual machine. To this end an information message with the required control information may be sent from the managing component to the system controller.

In one variant, the method performed by the managing component comprises receiving from the system controller an identity of the virtual machine. The control information may then be sent responsive to receipt of the identifier from the system controller. In this context, the managing component may either locally consult a mapping between the identifier of the virtual machine and the function associated therewith so as to determine the function of the virtual machine that is to be sent as control information to the system controller. In another variant, the managing component sends the mapping between the identifier of the virtual machine and the function associated therewith as control information to the system controller. The system controller may thus locally consult the received mapping to determine whether the function associated with the virtual machine form which it has previously received a request message.

Also provided is a computer program product comprising program code portions for performing the steps of any methods and method aspects disclosed herein when the computer program product is executed on at least one computing device. It will be appreciated that the computer program product may also be executed in a distributed manner on multiple computer devices. The computer program product may be stored on a computer-readable recording medium, such as a semiconductor memory, DVD or CD-ROM. The computer program product may also be provided for download via a communications network.

Further provided is a system controller of a virtualized application cluster comprising at least one virtual machine. The system controller comprises a first interface configured to receive, from outside the cluster, control information defining a function associated with a virtual machine and a second interface configured to receive, from the virtual machine, a request message including an identifier of the virtual machine. The system controller further comprises a processor configured to determine, based on the identifier included in the request message, the function associated with the virtual machine and further configured to determine booting information associated with the function. Still further, the system controller comprises a third interface configured to send a response message comprising the booting information to the virtual machine.

Moreover, a managing component of a virtualized application cluster is provided, wherein the cluster comprises a system controller and at least one virtual machine. The managing component comprises an interface configured to send, to the system controller, control information defining a function associated with the virtual machine.

The system controller and the managing component may additionally be configured to perform any of the methods and method aspects presented herein. Those methods and method aspects may be performed by the associated processor (optionally in combination with an associated interface).

The interfaces of the system controller and the managing component may be realized in the form of software, in the form of hardware, or as a software/hardware combination. Moreover, two or more of the interfaces of the system controller may be combined to a single interface as needed.

Also provided is a virtualized computing system comprising the system controller and the managing component presented herein. The virtualized application cluster may represent a network node of a telecommunications network. In such a realization, the virtual machines of the virtualized application cluster may run different network node applications.

BRIEF DESCRIPTION OF THE DRAWINGS

Further aspects, details and advantages of the present disclosure will become apparent from the following description of exemplary embodiments in conjunction with the accompanying drawings, wherein.

DETAILED DESCRIPTION

Figure 1:
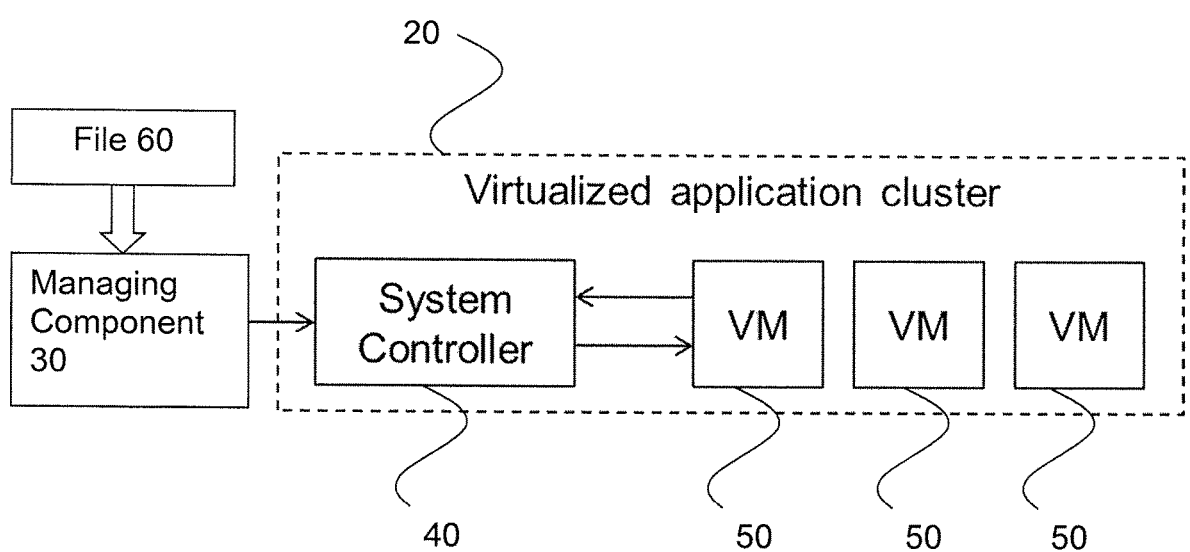
FIG. 1 schematically shows components of a virtualized computing system according to an embodiment of the present disclosure.

In the following description of exemplary embodiments, for purposes of explanation and not limitation, specific details are set forth, such as particular methods, functions and procedures, in order to provide a thorough understanding of the technique presented herein. It will apparent to one skilled in the art that this technique may be practiced in other embodiments that depart from these specific details. For example, while the following embodiments will primarily be described with respect to exemplary protocols (e.g., DHCP, TFTP, etc.) and particular identifier types (e.g., MAC addresses, etc.), it will be evident that the present disclosure can also be practiced using different protocols and different identifiers.

Moreover, those skilled in the art will appreciate that the methods, functions and procedures explained herein may be implemented using software functioning in conjunction with one or more programmed processors, an Application Specific Integrated Circuit (ASIC), a Digital Signal Processor (DSP) or general purpose computers. It will also be appreciated that while the following embodiments will primarily be described in the context of methods and virtual or physical devices, the present disclosure may also be embodied in a computer program product which can be loaded to run on a computer or a distributed computer system comprising one or more processors and one or more memories functioning as storage, wherein the one or more memories are configured to store one or more programs that realize the technique presented herein when the one or more programs are executed on one or more computers.

The following embodiments describe aspects in connection with the deployment of one or more virtual machines in a virtualized application cluster. The virtual machines typically assume dedicated functions, or roles, within the cluster. Those functions rely on dedicated software and/or hardware configurations that are defined in initial booting procedures. The booting procedures may involve request/response messaging with a system controller, for example in an initial discovery phase to request IP or other network addresses by the virtual machines. In such requests, the virtual machines may signal their identifiers, such as their MAC addresses.

When booting a new virtual machine that is part of a clustered application, the system controller of that cluster may get requests from multiple virtual machines but it often does not know anything about the virtual machines issuing these requests (e.g., it sees unknown MAC addresses). As a result, the system controller cannot infer what kind of software should be installed on the virtual machines, and it cannot even be sure that a particular virtual machine should be part of the cluster at all, or if the request was received from a virtual machine that was not supposed to boot on a specific subnet (e.g., the one associated with the system controller).

This situation can cause problems because although all virtual machines may start booting in the same way, they may need to have different characteristics which require that each virtual machine gets exactly the function, or role, (and the corresponding software) that was allocated to it. Exemplary characteristics that can differ from one virtual machine to another include one or more of the amount of memory, the number of virtual Central Processing Unit (CPU) cores, the number of virtual network cards and the way they are connected to the virtual switches, and so on. If the system controller cannot assign the right function (and software) to the right virtual machine, then the cluster may fail to boot or fail to run correctly.

Some of the following embodiments are thus directed to deploying a virtualized application cluster in a cloud and letting a system controller of that cluster know about the function, or role, of each of the virtual machines. Booting of these virtual machines involves the system controller, which therefore has to know how to assign the appropriate booting information (e.g., in terms of an Operating System, OS, kernel and other software) to each virtual machine. As said, in a virtual environment, the MAC addresses of the virtual machines may not be known in advance by the system controller, so the system controller has to be enabled to recognize the virtual machines belonging to the cluster. Various approaches for gaining such knowledge will now be described in more detail. This knowledge can also be useful after an initial deployment of the cluster, when new virtual machines are added via automatic or manual scaling, or in general for all lifecycle management operations on virtual machines belonging to that cluster.

FIG. 1 illustrates an embodiment of a virtualized computing system 10. As shown in FIG. 1, the virtualized computing system 10 comprises a virtualized application cluster 20 and a managing component 30 outside the cluster 20. The cluster 20, in turn, comprises a system controller 40 and one or more virtual machines 50. The system controller 40 may be a dedicated virtual machine itself. The clustered application may realize one or more functions of a telecommunications node. Exemplary telecommunications nodes in this regard include MSC-S BC, CSCF, MTAS, and so on.

The managing component 30 of the virtualized computing system 10 may take various forms. As an example, the managing component 30 may be a cluster manager. Since virtualized environments are sometimes also referred to as "clouds", the cluster manager is sometimes also referred to as cloud manager, or cloud orchestrator.

The managing component 30 is in one variant configured to deploy the cluster 20, and in particular the system controller 40 and the one or more virtual machines 50. It will be appreciated that the managing component 30 may be configured to deploy, and manage, multiple such clusters 20. Cluster deployment by the managing component 30 may be performed on the basis of control information received in the form of a file 60 or otherwise (e.g, via an operator setting). The managing component 30 can be operated for the initial deployment of the cluster 20 with the virtual machines 50, or when an additional virtual machine 50 is added a later point in time to the cluster 20 (e.g., to provide elasticity or application scaling).

The managing component 30 can generally be realized in the form of a software entity that provides an abstraction layer above a virtualization layer comprising the virtualized application cluster 20. As such, external applications requesting services provided by the cluster 20 may only see the abstraction layer. The abstraction layer with the managing component 30 may manage accesses to the underlying physical infrastructure and physical resources.

The system controller 40 within the virtualized application cluster 20 can also be realized in the form of a software entity. The system controller 40 may be a dedicated virtual machine itself. As such, the system controller 40 may be located together with the virtual machine 50 in the virtualization layer.

The virtual machines 50 may be realized in the form of software entities without disc space, which will be loaded only at run time. Since the virtual machines 50 at initial deployment will not have any software (e.g., an operating system) thereon, they rely on the system controller 40 for loading the required software and other configuration information at boot time depending on their function within the cluster 20.

The virtual machines 50 that form the virtualized application cluster 20 will then, upon booting from the system controller 40, be given dedicated network addresses (e.g., IP addresses) and various functions with the appropriate software and configuration information. Once the cluster 20 is ready (e.g., all virtual machines 50 have fully been booted), it will typically be visible to other systems as a single large system instead of a collection of individual virtual machines.

The virtual machines 50 are in one variant deployed using control information conforming to the Open Virtualization Format (OVF). OVF is an open standard defined by the Distributed Management Task Force (DMTF) and used for packaging and distributing virtual applications by way of OVF files (see reference numeral 60 in FIG. 1).

An OVF file is a descriptor file 60 in XML (Extensible Markup Language) format which describes the virtual hardware requirements and characteristics of the different virtual machines 50 forming the virtualized application cluster 20. As will be appreciated, there exist several other proposed standards and proprietary formats for descriptor files.

The descriptor file 60 is used as input for the managing component 30, such as a cloud manager. The descriptor file 60 is read by the cloud manager and controls the cloud manager when deploying the set of virtual machines 50 fulfilling the requested functions or services.

For the booting procedure, including the initial installation of software in the virtualized environment shown in FIG. 1, DHCP can be used, optionally, in combination with TFTP or a similar protocol. TFTP is a simple protocol that allows a virtual machine 50 to obtain the files that it needs for booting. For the installation process, an at least locally unique identifier needs to be associated with each virtual machine 50. The unique identifier makes it possible for a DHCP server to recognize an individual virtual machine 50 (i.e., its function) in order to assign an IP address to it and provide the right software and other configuration for that particular virtual machine 50.

Thus, DHCP may not only used to assign IP addresses but also to pass booting information (and other information about available services) to a requesting virtual machine 50 that needs to be booted. This information can include, but is not limited to, the addresses of routers, time servers, TFTP boot servers and file paths. Based on these parameters, the virtual machine 50 fetches all required data and software for the boot process and executes the boot process.

In the exemplary implementation of FIG. 1, the DHCP boot services and, optionally, the TFTP boot services, are provided by the system controller 40. It will be appreciated that those services could alternatively be provided by any other component inside or outside the virtualized application cluster 20.

The general boot process for the virtualized application cluster 20 in one or more of the embodiments described herein can be described with the example of a Preboot Execution Environment (PXE) boot process of a single virtual machine (VM) 50. In the following, it will be assumed that there is a running DHCP server in the same Layer 2 domain as the booting virtual machine 50:

1. VM 50 is deployed within the virtualized application cluster 20
2. VM 50 runs PXE boot program in firmware of a virtual network card
3. VM 50 sends out initial DHCP request message (with its identifier) to a broadcast address
4. VM 50 receives from the DHCP server a response message containing IP address, TFTP server address, and path to initial kernel (e.g., a linux kernel)
5. VM 50 sends TFTP get to a TFTP server for initial OS kernel (e.g., pxelinux.0)
6. VM 50 sends TFTP get to TFTP server for boot configuration (e.g., pxelinux.cfg/ . . . )
7. VM 50 receives from TFTP server the initial kernel
8. VM 50 receives from TFTP server a configuration file 9. VM 50 executes the initial kernel
10. VM 50 sends TFTP get to TFTP server for modules and an initial ramdisk (initrd)
11. VM 50 receives from TFTP server the initial ramdisk
12. VM 50 loads ramdisk and executes the content
13. VM 50 executes further boot scripts It can be easily understood that the booting information (in particular the TFTP server address and the path to the initial OS kernel) contained in the DHCP response determines the initial software loaded by the virtual machine 50. Therefore, this DHCP messaging may in one implementation be used to define the function, or role, the virtual machine 50 should execute in the virtualized application cluster 20 after it is booted. Details thereof will be described below.

In order to be able to assign the appropriate IP address, software and other configuration to the virtual machines 50 belonging to the cluster 20, the system controller 40 must know the individual functions, or roles, that these machines 50 have in the cluster 20. This knowledge can be obtained in several ways, such as dynamically configuring the system controller 40 with the at least locally unique identifiers of the virtual machines 50 belonging to that cluster 20 and their corresponding functions.

Figure 2:
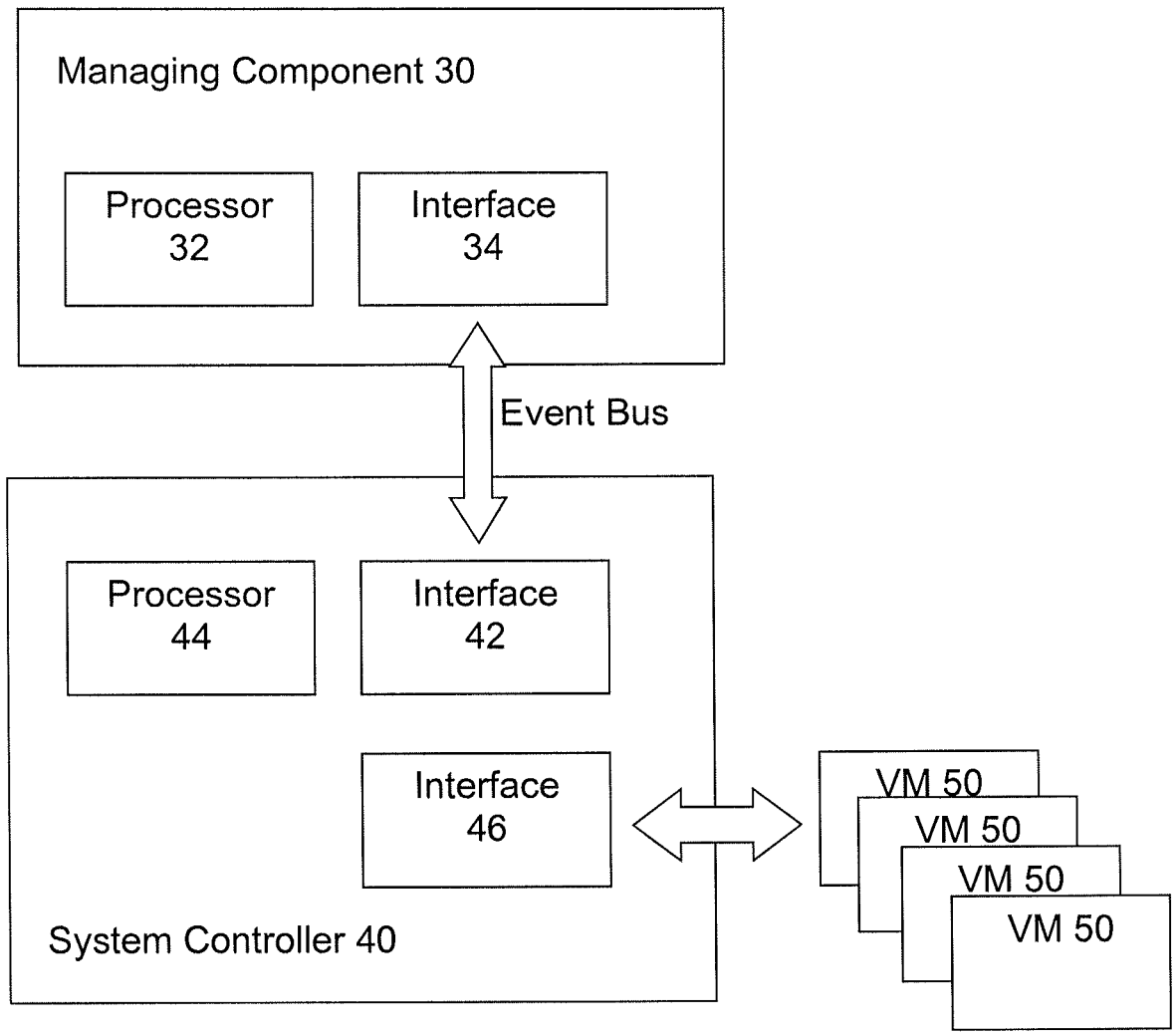
FIG. 2 schematically shows block diagrams of embodiments of a managing component and a system controller of the virtualized computing system of FIG. 1.
Figure 3:
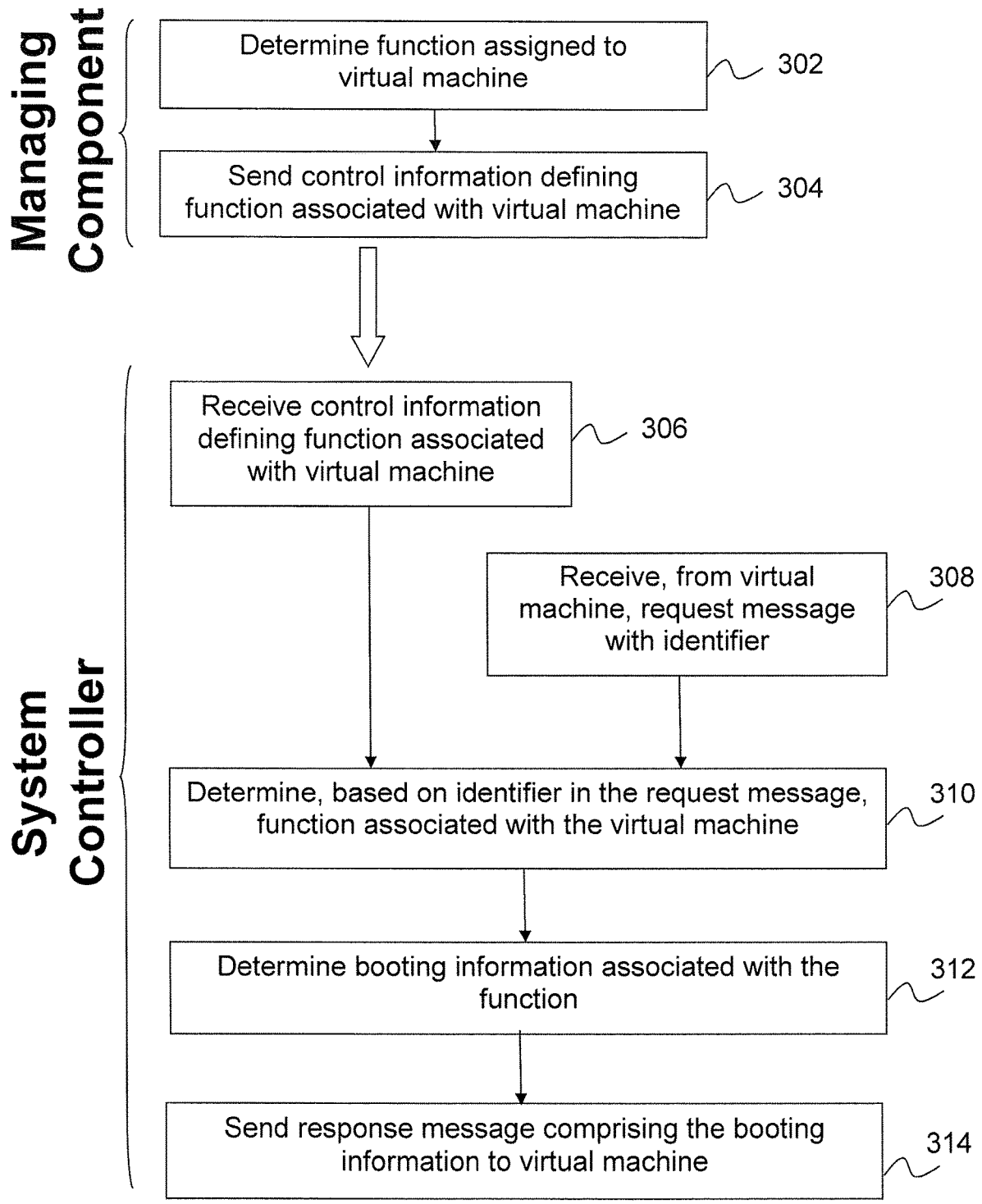
FIG. 3 is a flow diagram illustrating method embodiments for operating the managing component and the system controller of FIG. 2.

FIG. 2 illustrates block diagrams of the managing component 30 and the system controller 40 of FIG. 1. The block diagrams will now be explained in more detail in conjunction with the flow diagram of FIG. 3. FIG. 3 illustrates methods of operating the managing component 30 and the system controller 40 of FIG. 1

As shown in FIG. 2, the managing component 30 comprises a processor 32 that is configured to determine a function assigned to one of the virtual machines 50 (step 302). The function is in the present embodiment determined from control information read from the file 60 (see FIG. 1).

The processor 32 is further configured to determine an identifier of that virtual machine 50. The identifier may be determined by the managing component 30 autonomously (e.g., it may be assigned dynamically at deployment time) or based on control information read from the file 60. In one variant, the control information contained in the file 60 maps individual identifiers of virtual machines 50 to individual functions of those virtual machines 50 within the virtualized application cluster 20.

The managing component 30 further comprises an interface 34 configured to send an information message with control information to the system controller 40 (step 304). The control information comprises at least the function of a particular virtual machine 50. It will be appreciated that the control information may also comprise the identifier of the particular virtual machine 50 to which the function is assigned.

The system controller 40 comprises an interface 42 configured to receive the information message from the managing component 30 (i.e., from outside the cluster 20), see step 306. The system controller 40 comprises a further interface 44 configured to receive a request message from one of the virtual machines 50 (e.g., an initial DHCP request), see step 308. Steps 306 and 308 can be performed in any order.

A processor 44 of the system controller 40 is configured to determine, based on the identifier in the request message and the control information received from the managing component 30, the function associated with the virtual machine (step 310). The function may be derived from the mapping defined between the identifier in the request message and the function of the virtual machine 50 within the cluster 20. That mapping may be maintained by the system controller 40 on the basis of the control information contained in the information message received from the managing component 30. It will be appreciated that multiple identifiers (i.e., virtual machines 50) may be mapped on the same function.

The processor 44 is further configured to determine, in step 312, booting information associated with the function that was determined in step 310. To this end, a one-to-one mapping between functions and items of booting information may be consulted by the processor 44. The booting information thus determined is sent in a response message via an interface 46 to the virtual machine 50 (step 314). The booting information may in one variant conform to RFC 2132 of the Internet Engineering Task Force (IETF).

The interfaces 34, 42 between the managing component 30 and the system controller 40 a communication link (e.g., an "event bus") for communication between the managing component 30 and the system controller 40. The interfaces 34, 42 may thus be the endpoints of a (e.g., direct) communication link that permits the managing component 30 to inform the system controller 40 about the function and, optionally, the associated identity of a virtual machine that has been or will be newly deployed by the managing component 30. This information permits the system controller 40 to recognize a particular virtual machine 50 from the identifier in a request message received from the virtual machine 50, and to return the appropriate booting information to that virtual machine 50.

Figure 4:
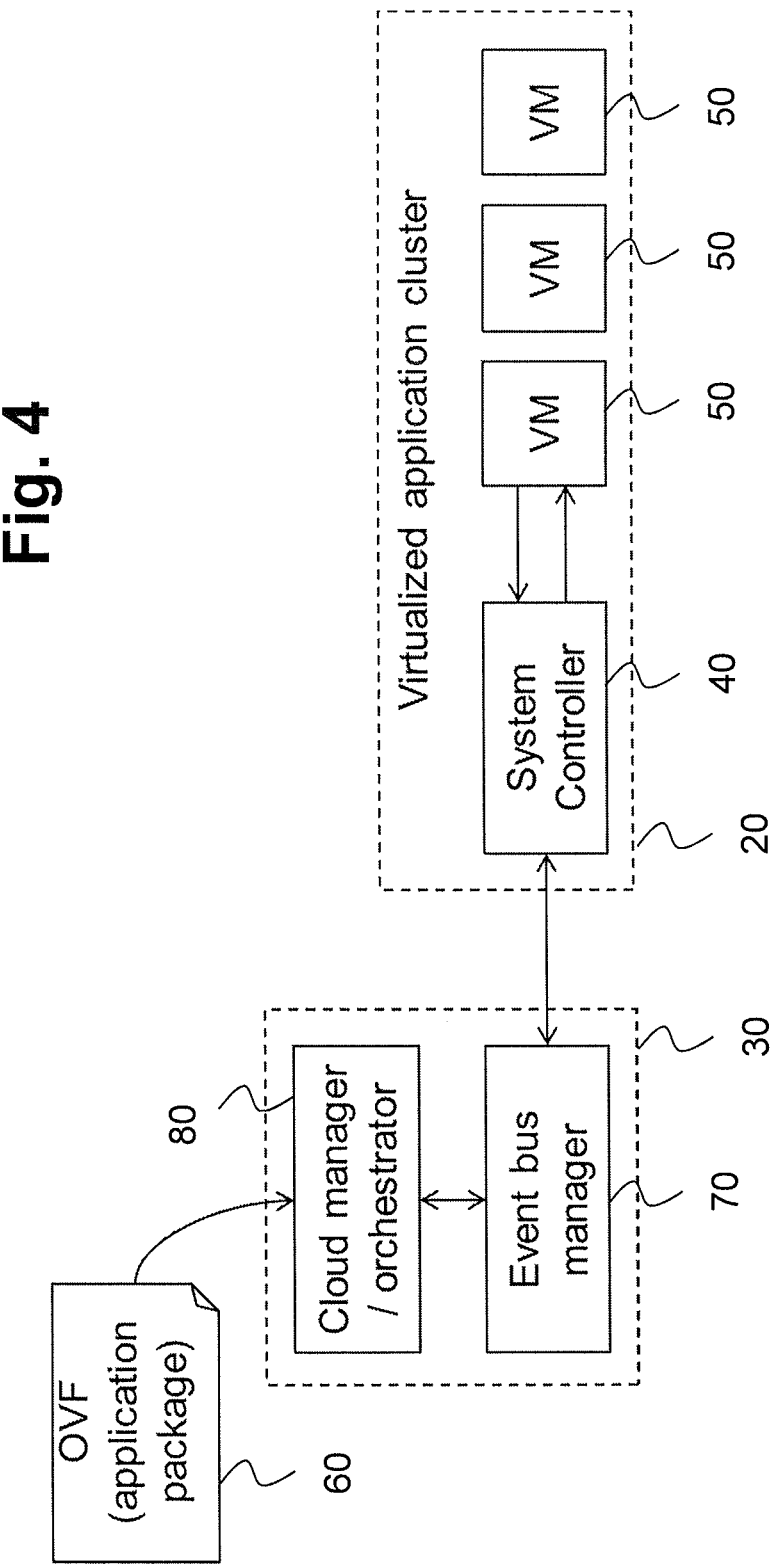
FIG. 4 is a schematic diagram illustrating another embodiment of a virtualized computing system.

In an embodiment depicted in FIG. 4, the managing component 30 of FIG. 2 is realized in the form of an event bus manager 70 situated between a so-called cloud manager 80 and the virtualized application cluster 20. The event bus manager 70 is responsible for controlling accesses to the event bus. As an example, the event bus manager 70 may provide authorization functions and, optionally, filtering of events coming from the cloud manager 80. In case the cloud manager 80 is not configured to generate such events, then the event bus manager 70 could also be the entity generating these events by observing the actions of the cloud manager 80. The cloud manager 80, in turn, is responsible for deployment of the system controller 40 and the (other) virtual machines 50.

In FIG. 4, the event bus manager 70 is co-located with the cloud manager 80 to form a single managing component 30. It will be understood that the event bus manager 70 is optional. In scenarios in which the event bus manager 70 does not exist as separate entity, its functionality can be integrated into the cloud manager 80.

In the following, two exemplary deployment scenarios for the virtual machines 50 will be described in more detail with reference to the signaling diagrams illustrated in FIGS. 5 and 6. Those signaling diagrams can be realized in connection with any of the embodiments discussed above with reference to FIGS. 1 to 4.

Figure 5:
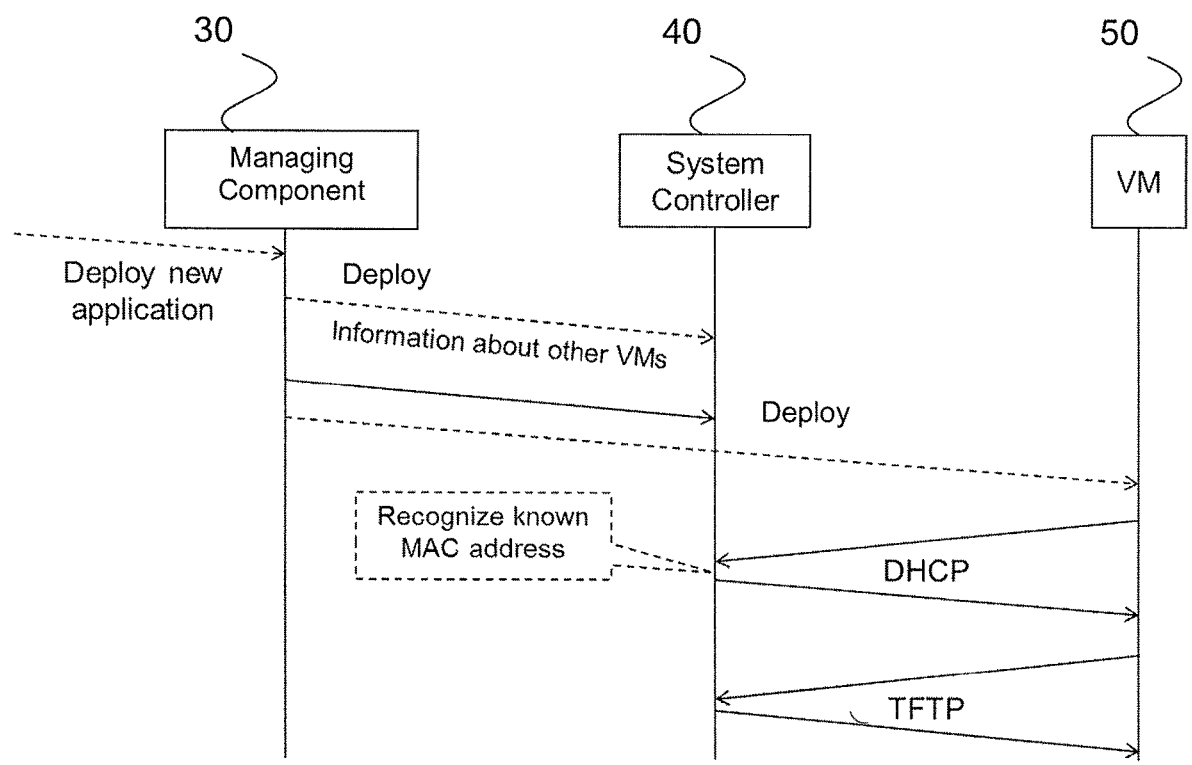
FIG. 5 is a schematic diagram of a first signaling embodiment.
Figure 6:
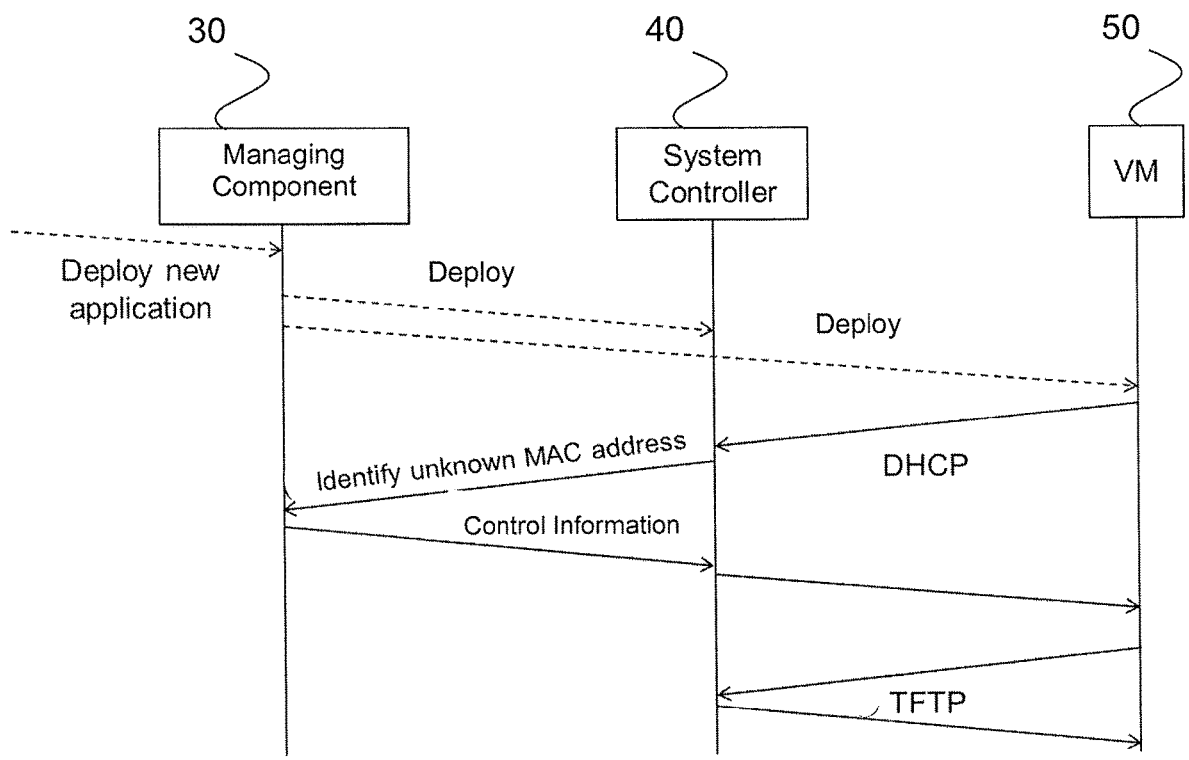
FIG. 6 is a schematic diagram of a second signaling embodiment.

The signaling diagrams of FIGS. 5 and 6 assume that there is a communication protocol in place between the managing component 30 and the system controller 40 that allows the former to send one or more information messages with control information to the latter. This communication protocol can be unidirectional if there is no need for the system controller 40 to confirm that it has correctly processed the information messages received from the managing component 30. The communication protocol can also be bidirectional and may allow the system controller 40 to confirm that it has correctly processed the information contained in the information messages. A bidirectional communication protocol may also be used to request the control information by the system controller 40 or to request that the control information be refreshed (e.g., when the system controller 40 restarts).

The communication protocol used between the managing component 30 and the system controller 40 may, for example, be based on any message queue protocol or any protocol suitable for sending notifications. In one implementation, the Hypertext Transfer Protocol (HTTP) can be used as communication, or transport, protocol (e.g., for REST-style requests to a predefined port number on the system controller 40). In another realization, a publish/subscribe mechanism could be used by which the system controller 40 connects to the managing component 30, for example to the event bus manager 70 of FIG. 4, and subscribes to events related to the virtual machines 50 of the particular cluster 20 controlled by the system controller 40.

With reference to FIG. 5, the signaling diagram illustrated therein is based on a unidirectional communication protocol. Specifically, the signaling diagram of FIG. 5 illustrates a "push" type message flow from the managing component 30 to the system controller 40. It will be appreciated that in alternative implementations a bidirectional communication protocol may be used.

In a first step shown in FIG. 5, the managing component 30 is triggered to deploy a new clustered application from an OVF file or any other kind of package format file 60 that defines one or multiple virtual machines 50. In a second step, the managing component 30 first deploys the system controller 40 of the clustered application. Deployment of the system controller 40 (and any of the further virtual machines 50) may comprise the creation of one or more virtual hardware elements, such as a virtual network card or a virtual Electronically Erasable Programmable Read-Only Memory (EEPROM).

Then, in a further step, the managing component 30 informs the system controller 40, typically before deploying the (further) virtual machines 50, of functions assigned to the virtual machines 50 using one or more information messages. Each function may be defined by an abstract identifier (e.g., as read from the file 60) and may apply to a single virtual machine 50 or a group of virtual machines 50 within the cluster 20. The managing component 30 does not have to know the meaning of that identifier and/or function, which is only relevant for the system controller 40.

Control information processed by the managing component 30 and/or received by the system controller 40 from the managing component 40 may associate, or map, the MAC address of each virtual machine 50 with the function this virtual machine 50 should have within the cluster 20. The following table schematically illustrates an exemplary data structure that may be read by the managing component 30 from the file 60 and/or signaled as control information to the system controller 40:

| MAC Address of VM 50 | Function of VM 50 |
|---|---|
| MAC1 | File Server |
| MAC2 | File Server |
| MAC3 | File Server |
| MAC4 | Application Server |

The above table pertains to an exemplary cluster 20 comprising four virtual machines 50 (plus the system controller 40). The four virtual machines 50 are associated with the four MAC addresses MAC1 to MAC4 (or any alternative identifier that need not necessarily be a network address), respectively. Each MAC address is mapped on a dedicated function of the associated virtual machine 50 within the cluster 20. In the above example, the three virtual machines 50 with MAC addresses MAC1 to MAC3 provide (the same) file services within the cluster 20, while the fourth virtual machine 50 provides application services. As stated above, each function in the above table could also be expressed by an abstract function identifier.

In certain implementations the above table may be extended by an individual IP address that has been assigned to an individual virtual machine 50. There may exist a one-to-one mapping between MAC addresses and associated IP addresses.

The control information illustrated in the above table is received by the system controller 40 in the form of one or multiple information messages after its deployment and is kept, or maintained, by the system controller 40 so that it can recognize the virtual machines 50 belonging to the virtualized application cluster 20.

Returning to FIG. 5, after having sent the control information to the system controller 40, the managing component 30 deploys one or more virtual machines 50 and configures the virtual machines 50 based on the MAC addresses (or alternative identifiers) assigned to them (see the above table). When a virtual machine 50 starts to boot (e.g., using the PXE boot process described above) and sends a DHCP request message with its pre-configured MAC address to the system controller 40 in a further step, the system controller 40 tries to map the MAC address of the virtual machine 50 to a function the virtual machine 50 should have within the cluster 20 (see the table above).

The system controller 40 then tries to determine the required booting information. To this end, a further mapping table may be maintained by the system controller 40 as shown below:

| Function | Booting Information |
|---|---|
| File Server | Booting Package 1 |
| Application Server | Booting Package 2 |

In the above table, different booting packages are mapped on different virtual machine functions in the cluster 20. A booting package may define a TFTP server address (which may optionally be the same for all packages) and one or more file paths to one or more boot files on the TFTP server (which typically differ for different packages), see also RFC 2132. It will be appreciated that the above two tables can be combined as needed and that the association defined in both tables could alternatively be expressed in any other form, such as individual data sets dedicated to individual virtual machines.

Still referring to FIG. 5, the system controller 40 returns the determined booting information (TFTP server address and path to one or more boot files on the TFTP server) for the function to be fulfilled by the requesting virtual machine 50 in a DHCP response. The DHCP response message also contains the IP address(es) assigned to the virtual machine 50, as explained above. In the present embodiment, the system controller 40 further functions as TFTP server, so that in further signaling steps the virtual machine 50 can retrieve the required software via TFTP messaging from the system controller 40.

It should be noted that an information message (e.g., in the form of an information file) can be sent to the system controller 40 by the managing component 30 before booting the first virtual machine 50 as shown in FIG. 5. In such a case, the information message may contain information (identifiers, functions, etc.) pertaining to multiple virtual machines 50 at a time. Alternatively, the information message can be sent separately for each virtual machine 50 just before it is booted. In such a case an information message typically only contains control information pertaining to a single virtual machine 50. If new virtual machines 50 are added to the cluster 20 at a later point in time, further information messages may be sent to the system controller 40.

The alternative signaling scenario illustrated in FIG. 6 is similar to the signaling scenario described above with reference to FIG. 5, except that the managing component 30 does not have to send one or more information messages (e.g., information files) to the system controller 40 before deploying the first virtual machine 50. Instead, the system controller 40 will specifically request the managing component 30 to provide the control information the system controller 40 requires to identify a particular virtual machine 50 from which the system controller 40 has received a DHCP request. The signaling scenario of FIG. 6 thus requires a bidirectional communication protocol between the managing component 30 and the system controller 40 to implement a "pull" type communication.

With respect to the signaling diagram illustrated in FIG. 6, the system controller 40 may request control information from the managing component 30 when the system controller 40 has been deployed and boots, which would then be very similar to the "push" type communication, except that the communication is initiated by the system controller 40. Alternatively, the system controller 40 may request the information on demand each time it gets a new DHCP request from an unknown MAC address as specifically shown in FIG. 6. That is, upon receipt of a DHCP request from a virtual machine 50, the system controller 40 may determine that the DHCP request contains an unknown MAC address (e.g., one that cannot be resolved using an existing mapping table as shown above, or that cannot be resolved because no or only an empty mapping table is maintained by the system controller 40). In this case the system controller 40 sends a request message (that optionally includes the unknown MAC address) to the managing component 30 as shown in FIG. 6. The managing component 30 then responds with an information message that contains control information defining the function of the requesting virtual machine 50.

In the scenario of FIG. 6, the system controller 40 may thus internally associate the unknown MAC address received from the virtual machine 50 with the assigned function signaled by the managing component 30. To this end, the system controller 40 may create a new mapping table or a new entry in an existing mapping table. As an example, the system controller 40 may in a first step fill in the unknown MAC address received from a virtual machine 50 in the mapping table and send the request message to the managing component 40. When the managing component 40 answers with the function associated with the unknown MAC address, the system controller 40 will in a second step complete the table entry with that function.

It will be appreciated that the system controller 40 may maintain a session context for a particular messaging sequence so that the managing component 30 does not have to return the unknown MAC address in connection with the function associated therewith. Moreover, it has again to be stressed that MAC addresses may be replaced by any other identifier (e.g., a Layer 3 identifier) capable of distinguishing the virtual machines 50 within the cluster 20.

It should be noted that the signaling diagrams illustrated in FIGS. 5 and 6 can be combined as needed. In other words, for a particular virtualized application cluster 20 one or more information messages may be sent by the managing component 30 based on a "push" type communication, while one or more further information messages may be sent using a "pull" type mechanism.

Figure 7:
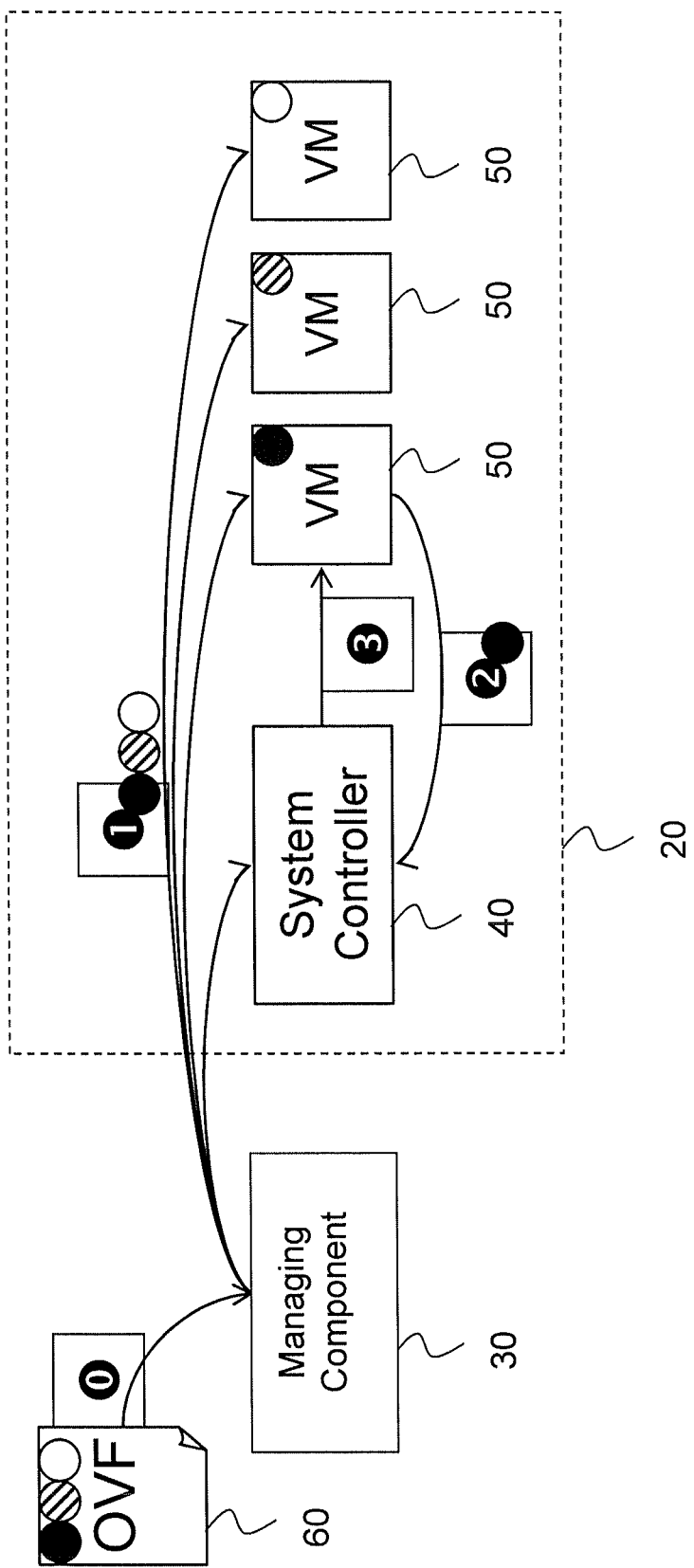
FIG. 7 is a schematic diagram showing a still further embodiment of a virtualized computing system according to the present disclosure.

FIG. 7 illustrates a further embodiment of the present disclosure, wherein a unique identifier different from a MAC address is used to differentiate each virtual machine 50. In the present embodiment, the uniqueness of the identifier is guaranteed by the managing component 30 and the virtual machine 50 itself. As an example, each virtual machine 50 may have a unique virtual EEPROM, a unique network card firmware or a unique Basic Input Output System (BIOS) that may be configured (e.g., programmed) at a deployment time by the managing component 30. With respect to the particular system embodiment illustrated in FIG. 7, the network card firmware of an individual virtual machine 50 is modified at deployment time in order to make this virtual machine 50 unique.

Initially, the managing component 30 again accesses a descriptor file 60, which defines the virtualized application cluster 20. The descriptor file 60 contains control information indicative of the functions of the virtual machines 50 to be deployed. In one variant, the descriptor file 60 further specifies the unique identifier of each virtual machine 50 to be deployed. In an alternative embodiment, a unique identifier is dynamically selected, or assigned, by the managing component 30.

The managing component 30 then deploys the system controller 40 first, followed by a deployment of the multiple virtual machines 50. The deployment of the system controller 40 and the virtual machine 50 follows the control information contained in the descriptor file 60. Upon creation of each individual virtual machine 50, the managing component 30 programs the network card firmware of each virtual machine 50 such that it includes the unique identifier assigned thereto. In the exemplary scenario illustrated in FIG. 7, different identifiers are represented by circles with different fillings.

During the boot process, each virtual machine 50 will send its identifier as a parameter in its initial DHCP request to the system controller 40. The DHCP request will typically include the unique identifier of the virtual machine 50 in addition to its (source) MAC address. The MAC address may have been randomly selected by the virtual machine 50.

It will be appreciated that the initial DHCP request will normally be sent to a broadcast address. As stated above, the system controller 40 can be part of the same Layer 2 domain as the virtual machine 50 and will thus receive the DHCP request containing both the unique identifier of the virtual machine 50 and its MAC address.

Once the system controller 40 has received the MAC address and the unique identifier of the virtual machine 50, it can match the unique identifier with the function the virtual machine 50 will have within the cluster 20. This matching can be performed based on control information received by the system controller 40 in one or multiple information messages from the managing component 30. Exemplary scenarios in this regard have been discussed above with reference to FIGS. 5 and 6.

Based on the matching process within the system controller 40, the system controller 40 will then return a dedicated IP address together with booting information (TFTP server address and path to one or more files) to the requesting virtual machine 50. The virtual machine 50 is thus enabled to boot with the appropriate software and configuration for its specific role within the cluster 20.

As has become apparent from the above description of exemplary embodiments, the technique presented herein permits a deployment of clustered applications in a cloud environment and a booting without requiring manual intervention. The technique also facilitates an increase or decrease of a cluster size by adding or removing virtual machines without manual intervention.

In certain variants, unique identifiers (e.g., MAC addresses) can be dynamically assigned to the virtual machines when they are created, instead of requiring the identifiers (e.g., MAC addresses) to be static and pre-configured. This approach is useful to allow two or more application clusters of the same type to be deployed (e.g., in the same network) without having conflicting identifiers (e.g., conflicting MAC addresses).

The technique presented herein can be useful for legacy application clusters that are to be ported to a cloud or virtualization environment and for new application clusters that are designed to work in both virtualized and physical deployments.

Modifications of the disclosed embodiments will come to mind to one skilled in the art having the benefit of the teachings presented in the foregoing description and the associated drawings. Therefore, it is to be understood that the present invention is not to be limited to the specific embodiments disclosed herein, and that modifications are intended to be included within the scope of this disclosure. Although specific terms may be employed herein, they are used in a generic and descriptive sense only and not for purposes of limitation.

The invention claimed is:

1. A method of operating a system controller of a virtualized application cluster, the cluster comprising at least one virtual machine, the method comprising:
   receiving a Media Access Control (MAC) address from a virtual machine within the cluster;
   determining that no computing role can be determined for the MAC address, and in response, sending the MAC address received from the virtual machine within the cluster towards outside the cluster;
   receiving, in response to the sending of the MAC address, a mapping between the MAC address and a computing role; and
   providing booting information to the virtual machine based on the computing role mapped to the MAC address.

2. The method of claim 1, wherein the mapping is received from a cluster manager in charge of deploying the system controller and the at least one virtual machine.

3. The method of claim 1, wherein:
   the mapping is received from a managing entity functionally located between the system controller and a cluster manager in charge of deploying the system controller and the virtual machine; and
   the managing entity is configured to generate the mapping based on an observation of the cluster manager.

4. The method of claim 1, wherein the booting information defines at least one of:
   an address of a boot server configured to provide one or more boot files to the virtual machine; and
   a file path to the one or more boot files.

5. A method of operating a managing component of a virtualized application cluster, the method comprising:
   deploying a system controller into the cluster;
   deploying a virtual machine into the cluster to fulfill a computing role;
   programming the virtual machine with a Media Access Control (MAC) address;
   receiving the MAC address from the virtual machine within the cluster via the system controller; and
   sending, to the system controller and in response to receiving the MAC address, a mapping between the MAC address and the computing role.

6. The method of claim 5, wherein the method is performed by a cluster manager in charge of deploying the system controller and the virtual machine, and programming the virtual machine with the MAC address comprises programming the virtual machine at deployment time.

7. The method of claim 5, further comprising:
   reading a descriptor of the virtualized application cluster; and
   deploying the virtual machine in accordance with deployment information comprised in the descriptor.

8. The method of claim 7, wherein the descriptor defines the computing role to be fulfilled by the virtual machine.

9. A system controller of a virtualized application cluster, the cluster comprising at least one virtual machine, the system controller comprising:
   processing circuitry and interface circuitry communicatively coupled to the processing circuitry, wherein the processing circuitry is configured to:
   receive a Media Access Control (MAC) address from a virtual machine within the cluster;
   determine that no computing role can be determined for the MAC address, and in response, send the MAC address received from the virtual machine within the cluster towards outside the cluster;
   receive, in response to the sending of the MAC address, a mapping between the MAC address and a computing role; and
   provide booting information to the virtual machine based on the computing role mapped to the MAC address.

10. A managing component of a virtualized application cluster, the managing component comprising:
    processing circuitry and interface circuitry communicatively coupled to the processing circuitry, wherein the processing circuitry is configured to:
    deploy a system controller into the cluster via the interface circuitry;
    deploy a virtual machine into the cluster to fulfill a computing role;
    program the virtual machine with a Media Access Control (MAC) address;
    receive the MAC address from the virtual machine within the cluster via the system controller; and
    send, to the system controller via the interface circuitry and in response to receiving the MAC address, a mapping between the MAC address and the computing role.

11. A virtualized computing system, comprising:
    a system controller of a virtualized application cluster, the cluster comprising at least one virtual machine, wherein the system controller comprises:
    interface circuitry and processing circuitry communicatively coupled to the interface circuitry, wherein the processing circuitry is configured to:
    receive a Media Access Control (MAC) address from a virtual machine within the cluster;

determine that no computing role can be determined for the MAC address, and in response, send the MAC address received from the virtual machine within the cluster towards outside the cluster;

receive, in response to the sending of the MAC address, a mapping between the MAC address and a computing role; and provide booting information to the virtual machine via the interface circuitry based on the computing role mapped to the MAC address; and a managing component of the virtualized application cluster, wherein the managing component is configured to send the mapping to the system controller.

* * * * *